Oct. 10, 1961 D. WEISS 3,003,188
APPARATUS AND METHOD FOR MAKING LARGE PLASTIC STRUCTURES
Filed July 13, 1959 4 Sheets-Sheet 1
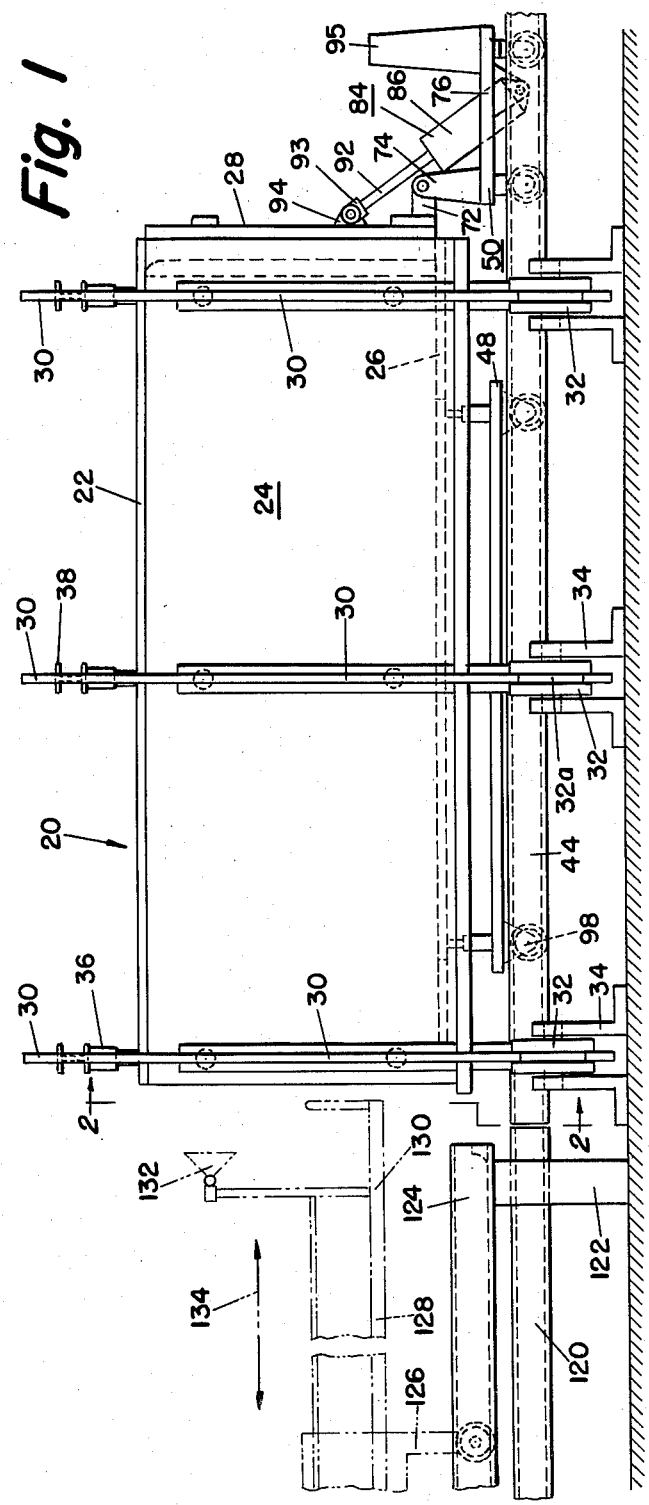
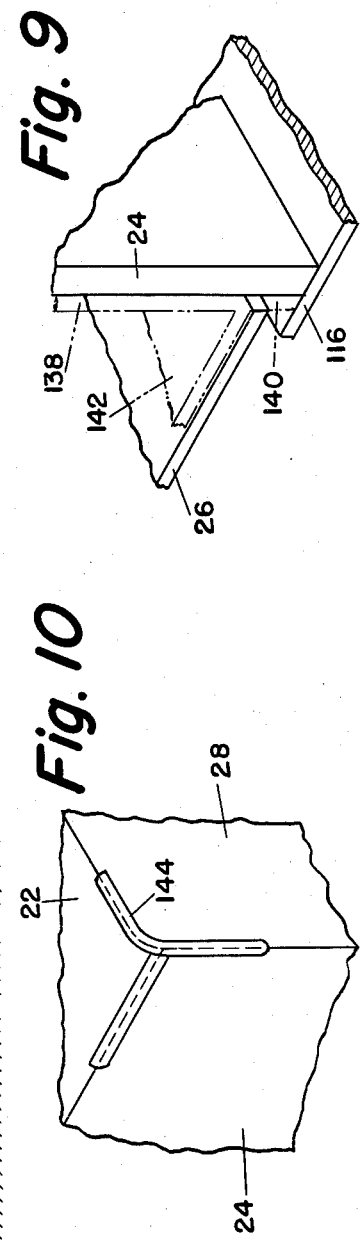
INVENTOR.
DAVID WEISS
BY Arthur H. Seidel
ATTORNEY

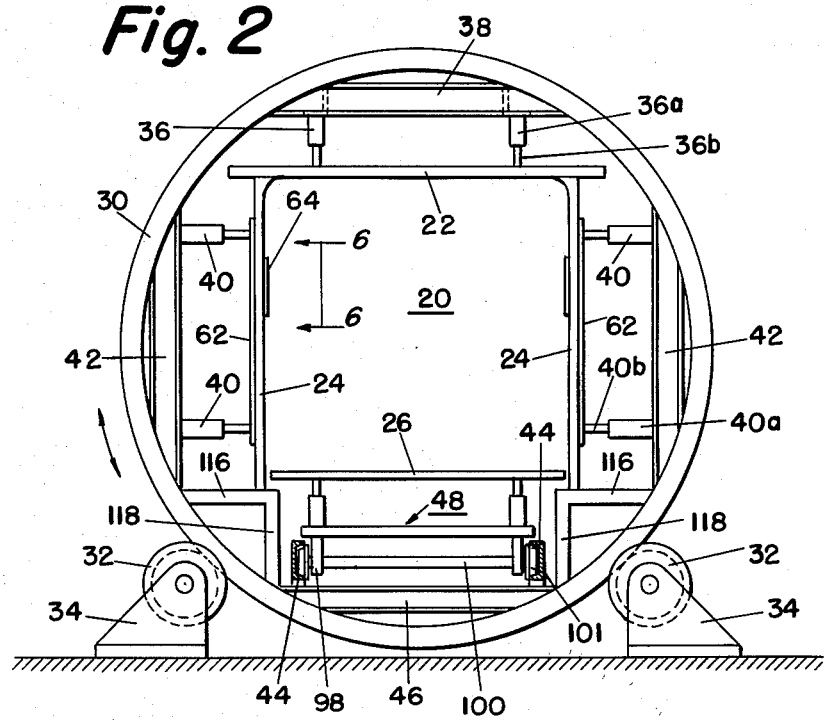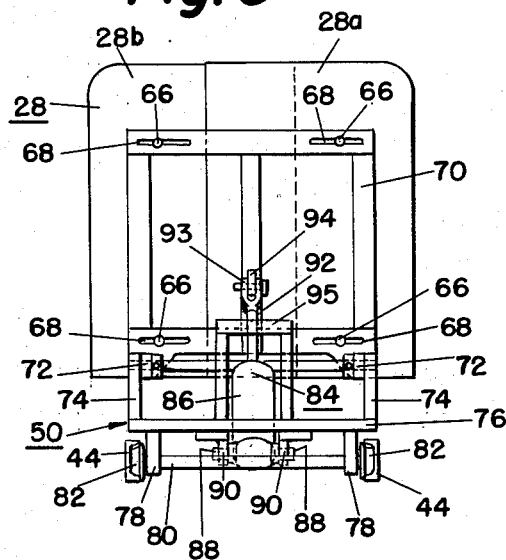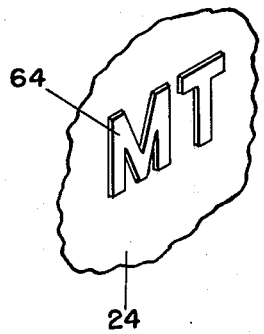

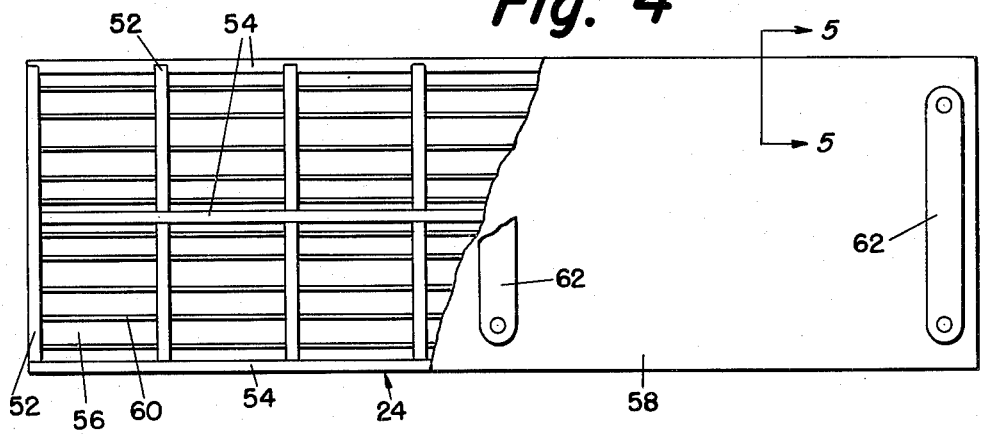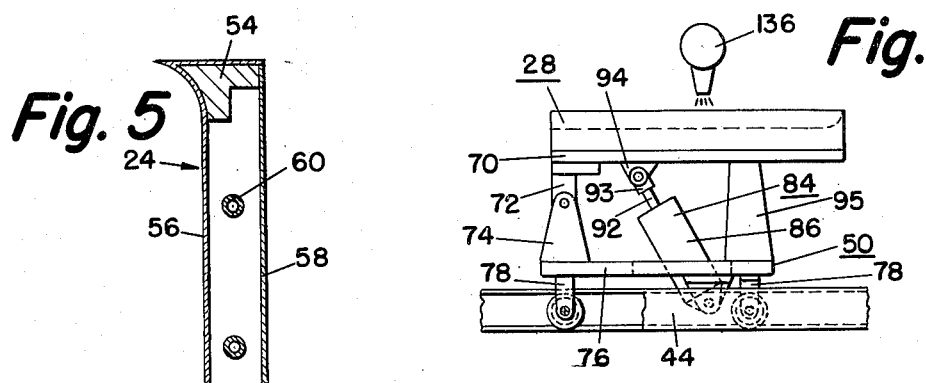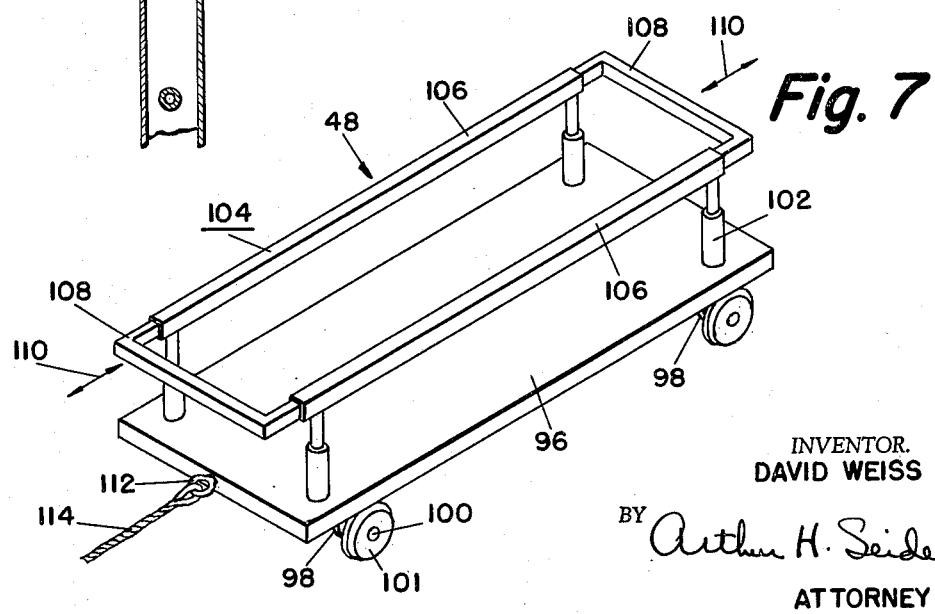

Oct. 10, 1961 D. WEISS 3,003,188
APPARATUS AND METHOD FOR MAKING LARGE PLASTIC STRUCTURES
Filed July 13, 1959 4 Sheets-Sheet 4
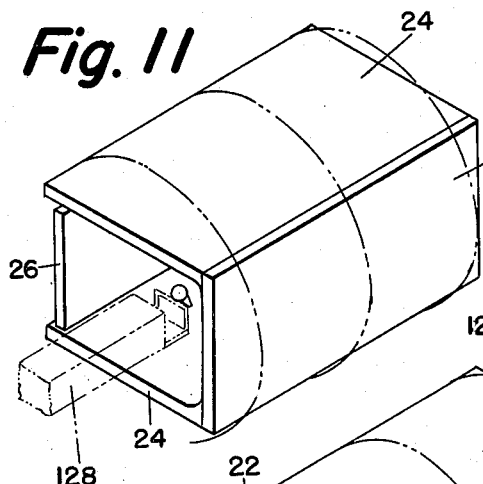
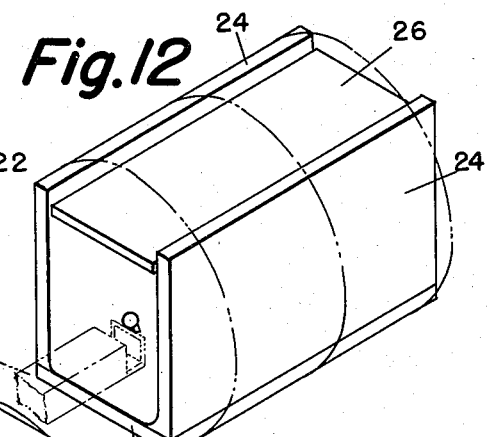
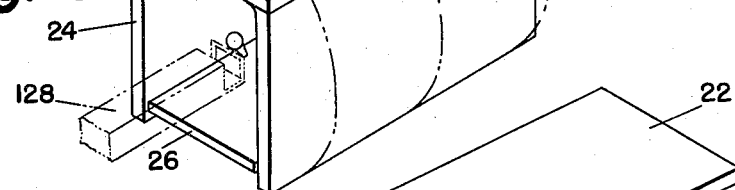
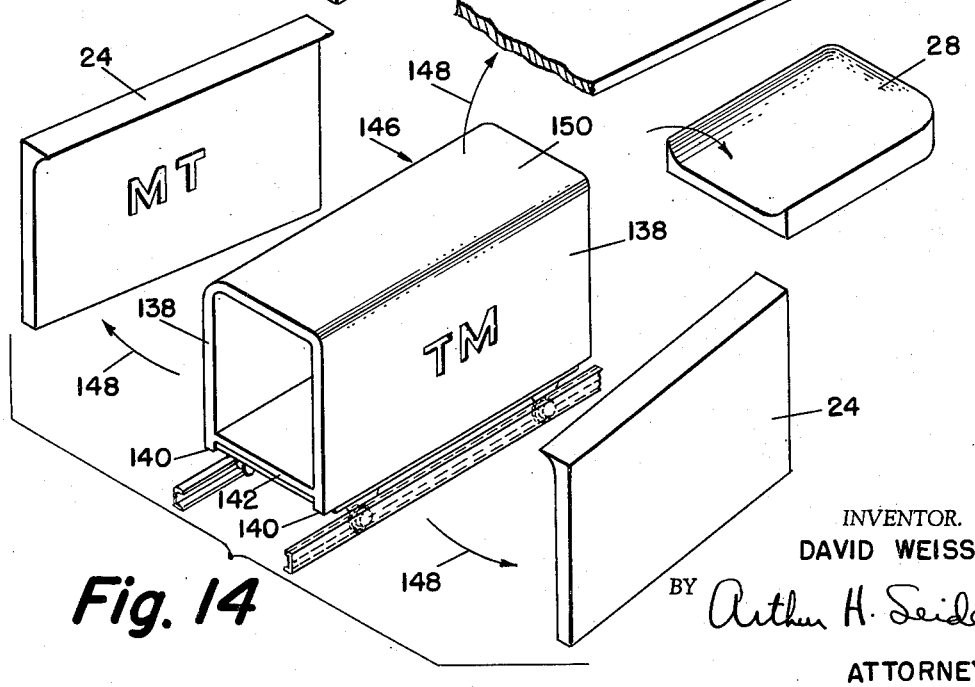
INVENTOR.
DAVID WEISS
BY Arthur H. Seidel
ATTORNEY

United States Patent Office 3,003,188
Patented Oct. 10, 1961

3,003,188
APPARATUS AND METHOD FOR MAKING
LARGE PLASTIC STRUCTURES
David Weiss, Philadelphia, Pa., assignor to Dalco Industries, Inc., Philadelphia, Pa., a corporation of Pennsylvania
Filed July 13, 1959, Ser. No. 826,856
10 Claims. (Cl. 18—26)

The present invention relates to apparatus and method for making large plastic structures. More particularly, the present invention relates to apparatus and method for making large plastic structures which have both vertical and horizontal surfaces. Even more particularly, the present invention relates to apparatus and method for making one piece, plastic truck bodies.

Truck bodies and similar large structures have been generally made of metal. However, because of the high cost of metal and the large amount of labor necessary to fabricate a truck body, metal truck bodies are relatively expensive. Also, the fabrication of a metal truck body takes considerable time, which adds to the cost of the metal truck body. Furthermore, metal truck bodies which are painted for protective, decorative, and advertising purposes require considerable maintenance to maintain the painted surface.

Until recently, it was impractical if not impossible to make truck bodies and similar large structures from plastics. Plastic members of relatively thin section were not strong enough to be used for fabricating large structures. The equipment necessary to mold heavy sections of plastic were impractical for making large structural members.

Recent advances in the field of plastics have developed reinforced plastics which have been found to be satisfactory for fabricating large structures such as truck bodies. Such reinforced plastics comprise essentially of a thermosetting resin combined with a reinforcing agent. Some of the thermosetting resins which are used are the phenolic resins, the acrylic resins (polymer or co-polymers of acrylic acid, methacrylic acid, esters of these acids, or acrylonitrile), the polyester resins (synthetic resins produced by the esterification of polybasic organic acids with polyhydric alcohols), epoxy resins (resins obtained by the condensation of phenol, acetone, and epichlorohydrin), and mixtures of these resins, such as epoxy-polyester resins and acrylic-polyester resins. Some of the reinforcing agents which are used with these resins are glass fibers, asbestos, sisal, wood, metals, and synthetic fibers.

To make a reinforced plastic article, the resin in liquid form and the reinforcing agent is sprayed, brushed or otherwise applied onto a surface of a mold, and the resin is cured. Multiple layers of the resin and the reinforcing agent can be applied to obtain a desired thickness and strength of the plastic. Since the resin is applied in liquid form, the surface of the mold being coated should be horizontal and facing upwardly. If the surface of the mold being coated is not horizontal and facing upwardly, the resin will flow or sag before it can be cured. Thus, the surface of the finished article will be uneven, and the article will not be of uniform thickness. The necessity of having the mold surface horizontal and facing upwardly has limited the types of articles which have been made from reinforced plastic.

It is an object of the present invention to provide apparatus and method for making large reinforced plastic structures.

It is another object of the present invention to provide apparatus and method for making large structures having both vertical and horizontal surfaces of reinforced plastic.

It is still another object of the present invention to provide apparatus and method for making large plastic structures quickly and with a minimum of labor.

It is a further object of the present invention to provide apparatus and method for making plastic truck bodies.

It is a still further object of the present invention to provide apparatus and method for making one-piece plastic truck bodies.

Other objects of the invention will appear hereinafter.

In the drawing wherein similar parts are designated by similar reference numerals there are throughout:

FIGURE 1 is a side elevational view of the apparatus of the present invention.

FIGURE 2 is an end elevational view of the apparatus of the present invention looking in the direction of arrows 2—2 in FIGURE 1.

FIGURE 3 is an elevational view of the back wall of the mold of the present invention.

FIGURE 4 is a side elevational view, partially broken away, of a side wall of the mold of the present invention.

FIGURE 5 is a sectional view taken along line 5—5 of FIGURE 4.

FIGURE 6 is a perspective view of a portion of the inside surface of a side wall of the mold looking in the direction of arrows 6—6 in FIGURE 2.

FIGURE 7 is a perspective view of the dolly for the floor of the mold of the present invention.

FIGURE 8 is a side elevational view of the end wall of the mold in its position for being coated with the reinforced plastic.

FIGURE 9 is a perspective view of the junction between the floor and a side wall of the mold of the present invention.

FIGURE 10 is a perspective view of the junction between a side wall, the top wall, and the end wall of the mold.

FIGURE 11 is a diagrammatic view showing the mold in position for coating one side wall of the mold.

FIGURE 12 is a diagrammatic view showing the mold in position for coating the top wall of the mold.

FIGURE 13 is a diagrammatic view showing the mold in position for coating the floor of the mold.

FIGURE 14 is a diagrammatic view showing the manner of stripping the mold from the finished truck body.

Referring to FIGURES 1 and 2 of the drawing, the apparatus of the present invention includes a mold, generally designated as 20. Mold 20 comprises a top wall 22, a pair of spaced, parallel side walls 24, a floor 26, and an end wall 28.

Surrounding the top wall 22, side walls 24, and floor 26 of the mold 20 are three metal rings 30. Rings 30 are spaced longitudinally along the mold 20 so that there is a ring 30 adjacent each end of the mold 20, and a ring 30 intermediate the ends of the mold 20. Each ring 30 is supported in an upright position on a pair of rollers 32. Rollers 32 each has a peripheral groove 32a in which the periphery of the ring 30 fits. Each of the rings 32 is rotatably supported between the upright arms of a pair of spaced flanges 34. The base of each flange 34 is bolted or otherwise secured to the ground or floor of the building.

Top wall 22 of mold 20 is supported from each of the rings 30 by a pair of spaced hydraulic jacks 36. The cylinders 36a of jacks 36 are secured to a beam 38 which is secured to and extends across a chord of the ring 30. The pistons 36b of jacks 36 are secured to the top wall 22. Thus, the entire top wall 22 or any part thereof can be raised or lowered by means of the jacks 36.

Side walls 24 are each secured to each of the rings 30 by a pair of spaced jacks 40. The cylinders 40a of the jacks 40 are secured to a beam 42 which is secured to and extends across a chord of the ring 30. The pistons 40b of the jacks 40 are secured to the side walls 24. Thus, the side walls 24 can be moved toward and away from each other by means of the jacks 40.

A pair of spaced, parallel tracks 44 extend longitudinally through the rings 30 and project beyond each end of the mold 20. Tracks 44 are beneath the top wall 22 and between the side walls 24. Each ring 30 has a chordal beam 46 secured thereto which extends beneath the tracks 44. The tracks 44 are each secured to each of the beams 46. Tracks 44 are each U-shaped with the flanges of each track extending inwardly toward the other track 44. A dolly, generally designated as 48, rides on the tracks 44, and carries the floor 26 of the mold 20.

End wall 28 is also carried on a dolly, generally designated as 50. Dolly 50 rides on tracks 44 beyond one end of the mold 20.

FIGURES 4 and 5 show the construction of the side walls 24 of the mold 20.

Side wall 24 comprises a substantially rectangular frame made up of a plurality of spaced, vertical ribs 52 connected together by a plurality of spaced, horizontal ribs 54. A skin 56 covers the inside of the frame and is secured to the ribs 52 and 54. A skin 58 covers the outside of the frame and is likewise secured to the ribs 52 and 54. The skins 56 and 58 can be made of metal, wood, or reinforced plastic. The exposed surface of skin 56 is highly polished for reasons which will be explained below. The other surface of skin 56 is blackened so that it will more readily absorb heat. The inside surface of skin 58 is either highly polished or plated so that it will reflect heat. A heater 60 extends back and forth across the wall 24 between the skins 56 and 58. Heater 60 may be an electrical resistance wire encased in a flexible metal conduit, or a pipe through which a heated liquid, such as water or a brine solution, or steam, is passed. The skin 58 has three vertical pads 62 secured to its outer surface to which the pistons 40b of jacks 40 are secured. The upper edge of skin 56 is curved to provide the truck body with a rounded corner.

As shown in FIGURE 6, raised letters 64 and/or other indicia, such as trademark or advertising designs may be attached to the outer surface of skin 56 of the side wall 24. This will provide the truck body with permanent advertising matter, such as a name or the like. Letters 64 should be highly polished and placed in reverse order with each letter being backwards.

Top wall 22 is constructed in substantially the same manner as side walls 24. Top wall 22 can be flat or bowed to form a roof of any desired shape. Top wall 22 is also provided with a heater extending therethrough for heating the inner surface of the top wall 22. The inner surface of the top wall 22 is also highly polished.

Referring to FIGURES 1 and 3, end wall 28 is substantially rectangular and is divided vertically into two sections 28a and 28b. Each of the sections 28a and 28b of end wall 28 is constructed in the same manner as the side wall 24. Thus, each of the sections 28a and 28b has a heater extending therethrough and a highly polished inner surface. However, each of the sections 28a and 28b has both its upper edge and its outer edge rounded in the same manner as the upper edge of side wall 24 to provide the truck body with rounded corners.

A pair of bolts 66 project from each of the sections 28a and 28b of end wall 28, and extend through elongated slots 68 in opposite sides of a frame 70. A nut is threaded on the end of each bolt 66 to lock the sections 28a and 28b to the frame 70 in side by side relation.

By loosening the nuts or bolts 66 the sections 28a and 28b can be moved toward or away from each other to vary the width of the end wall 28.

Frame 70 has a pair of spaced clevises 72 projecting from its lower side. Clevises 72 are pivotly connected to tongues 74 which project upwardly from the front end of the base 76 of dolly 50. A pair of spaced, aligned feet 78 extend downwardly from each end of the base 76 of dolly 50. An axle 80 extends through each pair of aligned feet 78 and is supported by the feet 78. Wheels 82 are rotatably mounted on the ends of the axles 80. Wheels 82 ride on the tracks 44 between the flanges of the tracks 44.

A hydraulic jack 84 is connected between the base 76 of the dolly 50 and the frame 70 of the end wall 28. The cylinder 86 of the hydraulic jack 84 has a pair of trunnions 88 projecting from opposite sides of the cylinder 86 adjacent the bottom end of the cylinder 86. The trunnions 88 are rotatably supported in bearings 90 which are mounted on the bottom of the base 76 of dolly 50. The end of the piston rod 92 of the hydraulic jack 84 is provided with a yoke 93 which is hingedly secured to a tongue 94 on the frame 70. Operation of the hydraulic jack 84 pivots the end wall 28 between an upright vertical position, as shown in FIGURES 1 and 3, and a horizontal position, as shown in FIGURE 8. The base 76 of the dolly 50 has an upright support 95 at its rear end which supports the end wall 28 in the horizontal position of the end wall 28.

Instead of the hydraulic jack, any other suitable mechanism can be used for pivoting end wall 28 between its horizontal and vertical positions. For example, such mechanism could comprise an arcuate rack connected to the frame 70 and driven by a gear mounted on the base 76, or by a suitable mechanical linkage connected between the frame 70 and base 76 and driven by power beams mounted on the dolly 50.

FIGURE 7 shows the dolly 48 which supports the floor 26 of mold 20. Dolly 48 comprises a substantially rectangular base 96 having a pair of spaced, aligned feet 98 extending downwardly from each end thereof. An axle 100 extends through each pair of feet 98, and wheels 101 are rotatably mounted on the ends of the axles 100. Wheels 101 ride on tracks 44 between the flanges of the tracks 44. A hydraulic jack 102 is mounted in an upright position on each corner of base 96. Hydraulic jacks 102 support a substantially rectangular frame 104. Frame 104 comprises a pair of elongated, hollow sides 106, and a pair of substantially U-shaped ends 108. Each side 106 is supported on the ends of the pistons of a pair of the jacks 102. Ends 108 extend between the sides 106 with the arms of the ends 108 slidably fitting into the sides 106. Thus, the length of frame 104 can be varied by moving ends 108 toward or away from each other in the direction indicated by arrows 110. Base 96 has an eye 112 secured to one end thereof to which a cable 114 is attached for moving the dolly 48 along the tracks 44.

The floor 26 of mold 20 comprises a substantially rectangular sheet or sheets of wood, such as plywood, or a suitable plastic. Floor 26 is supported on the frame 104 and is clamped to the frame 104 by suitable clamping means, not shown.

A pair of horizontal ledges 116 extend longitudinally through the rings 30 beneath the side walls 24 and on opposite sides of the tracks 44. The outer edges of the ledges 116 are secured to the rings 30 and the inner edges of the ledges 116 are supported by posts 118. Ledges 116 extend inwardly from ring 30 beyond the inner surface of side walls 24 and under the floor 26.

Rings 30 are rotated on rollers 32 by a suitable source of power, not shown. The source of power may be connected to rotate one or more of the rollers 32, and thereby rotate the rings 30. The source of power may drive the rings 30 directly through a wheel which engages the outer circumference of the rings 30. By rotating rings 30, the mold 20 can be rotated to bring either its top wall 22, side walls 24, or floor 26 to a horizontal position. Since the wheels 101 and 82 of dollies 48 and 50 ride between the flanges of tracks 44, the dollies 48 and 50 will not become disengaged from the tracks 44 upon rotation of the mold 20.

Referring again to FIGURE 1, at the open end of mold 20, a pair of tracks 120, only one of which is shown, are supported on posts 122 in alignment with tracks 44. Tracks 120 are shaped identical to tracks 44. Tracks 120 permit the dolly 48 which carries the floor 26 of mold 20 to be rolled out of the mold 20.

A second pair of tracks 124, only one of which is shown are mounted on the top of posts 122. A dolly 126 rides on tracks 124, and carries an elongated boom 128. Boom 128 and its dolly 126 are described in detail in my copending application Serial No. 826,855, filed on even date herewith, entitled "Boom." Boom 128 has a platform 130 on its end on which a man or men can stand. A light 132 is mounted over the platform 130 to illuminate the interior of the mold 20. Dolly 126 is movable along tracks 124 in the directions indicated by arrows 134 so as to carry the platform 130 into and out of the mold 20. Boom 128 is long enough to permit the platform 130 to be carried throughout the complete length of the mold 20. Also mounted on the platform 130 is a control panel, not shown, for controlling the movement of the boom dolly 26, the rotation of mold 20, the hydraulic jacks 36, 40, 84 and 102.

The operation of the apparatus of the present invention for making a one-piece plastic truck body is as follows:

A sheet or sheets of wood for floor 26 is placed on and clamped to the frame 104 of dolly 48. With the mold 20 positioned as shown in FIGURES 1 and 2, dolly 48 is rolled onto tracks 44 to position floor 26 under top wall 22. Dolly 48 may be provided with a brake for locking the dolly in this position. Side walls 24 are moved toward or away from each other by means of hydraulic jacks 40 to obtain the desired width for the truck body. Top wall 22 is then lowered onto the side walls 24 by means of the hydraulic jacks 36. Sections 28a and 28b of end wall 28 are adjusted toward or away from each other so that the width of end wall 28 is the same as the distance between the inner surfaces of side walls 24. Sections 28a and 28b of end wall 28 are then clamped tightly to the frame 70. The desired height of the truck body is obtained by moving floor 26 up or down by means of hydraulic jacks 102.

After the walls of the mold 20 have been adjusted for size, the first step in the fabrication of the truck body is forming the end wall of the truck body.

To form the end wall of the truck body, the operator who is standing on the platform 130 of boom 128, actuates the hydraulic jack 84 to lower the end wall 28 of mold 20 to its horizontal position as shown in FIGURE 8. The operator then moves the boom 128 through the mold 20 until the platform 130 is over the end wall 28. While standing over the end wall 28, the operator coats the inner surface of the end wall 28 with the plastic and reinforcing agent.

The plastic and reinforcing agent may be applied to the inner surface of end wall 28 by spraying the liquid resin and the reinforcing agent onto the end wall 28 by means of a spray gun 136, diagrammatically shown in FIGURE 8, which is carried by the operator. A spray gun suitable for spraying both the resin and the reinforcing agent is described in United States Letters Patent No. 2,787,314, issued April 2, 1957, to D. F. Anderson, entitled "Apparatus and Method for Forming a Fiber Reinforced Plastic Article." However, other types of spray guns may be used for this purpose. Also, the plastic and reinforcing agent may be brushed or otherwise applied. After the entire inner surface of end wall 28 is coated with the desired thickness of the plastic and the reinforcing agent, the resin is allowed to harden sufficiently so that the resin will not flow. The inner surface of the end wall 28 may be heated by the heaters in the end wall 28 to hasten the hardening of the plastic.

After the plastic coating on the end wall 28 has hardened to a gel, the operator moves the boom 128 back until the platform 130 is within the mold 20. The operator then actuates the hydraulic cylinder 84 to pivot the end wall 28 to its vertical position and seat the end wall 28 tightly between side walls 24 and top wall 22 as shown in FIGURE 1. The heaters in end wall 28 may be left on to complete the curing of the plastic coated on the inner surface of the end wall 28. The end wall 28 is positioned along the side walls 24 and top wall 22 so that the distance between the end wall 28 and the opposite end of the mold 20 is equal to the desired length of the truck body to be made. Thus, truck bodies of various lengths can be made by varying the distance that the end wall 28 is moved longitudinally between the side walls 24.

The next step in the fabrication of the truck body is forming the side walls of the truck body.

The operator rotates the mold 20 until one of the side walls 24 of the mold 20 is in a horizontal position with the inner surface of the side wall 24 facing upwardly, as shown in FIGURE 11. The operator then coats the inner surface of the side wall 24 with the plastic and the reinforcing agent by spraying or otherwise applying the liquid resin and the reinforcing agent over the entire inner surface of the side wall 24. At the juncture of the side wall 24 and the floor 26 of the mold 20, the operator sprays the liquid resin and reinforcing agent through the gap between the side wall 24 and floor 26 to provide the side wall 138 of the truck body with an apron 140 which extends below the floor 142 of the truck body to the ledge 116, as shown in FIGURE 9.

After the resin coated on the side wall 24 of mold 20 has gelled, which can be hastened by heating the side wall 24 by the heater 60, the operator rotates the mold 20 through one hundred and eighty degrees to bring the other side wall 24 to a horizontal position with the inner surface of the other side wall 24 facing upwardly. The operator then coats the second side wall 24 with the liquid resin and reinforcing agent in the same manner as he coated the first side wall 24.

After both side walls 24 have been coated and the resin permitted to gel, the next part of the truck body formed is the roof of the truck body. The operator rotates the mold 20 until the top wall 22 of the mold 20 is horizontal with the inner surface of the top wall 22 facing upwardly, as shown in FIGURE 12. The operator coats the entire inner surface of the top wall 22 with the liquid resin and the reinforcing agent, and permits the resin to gel.

The final part of the truck body formed is the floor of the truck body. The operator rotates the mold 20 until the floor 26 of the mold 20 is horizontal with its inner surface facing upwardly. The operator then coats the surface of the floor 26 with the liquid resin and the reinforcing agent. Since the floor 26 is not directly heated, the resin coated on the floor 26 will take a little longer to gel. However, with the heaters in the side walls 24 and end wall 28 turned on, some of the heat from the side walls 24 and end wall 28 will be conducted to the floor 26 to help in the hardening and curing of the resin coated on the floor 26.

Prior to coating the walls of the mold 20 the operator should examine the junction of the side walls 24, top wall 22, and end wall 28 for any gaps between these walls. The operator should cover any such gaps by placing a strip of self-adhesive tape 144 along the junction of the walls, as shown in FIGURE 10. Likewise, any gap between the sections 28a and 28b of end wall 28 should be covered by a strip of the tape 144 prior to coating the end wall 28. Also, the inner surfaces of the side walls 24, top wall 26, and end wall 28 should be coated with a mold release material prior to applying the plastic and reinforcing agent.

After all of the walls of the mold 20 have been coated, and the resin has been completely cured, the final step is to strip the mold 20 from the plastic truck body. The mold 20 is stripped from the truck body by peeling the walls of the mold 20 from the truck body. FIGURE 14 diagrammatically illustrates the manner of peeling the walls of the mold 20 from the completed truck body 146.

The top wall 22 of the mold 20 is peeled from the truck body 146 by first operating the hydraulic jacks 36 which are mounted on the ring 30 adjacent the open end of the mold to pull back the ends of the wall 22 from the truck body 146 in the direction of arrow 148 in FIGURE 14. Since the inner surface of the top wall 22 is highly polished and, is coated with a mold release, the wall 22 can be easily freed from the roof 150 of the truck body 146. After the end portion of the top wall 22 has been freed from the roof 150 of the truck body 146, the hydraulic jacks 36 on the center ring 30 are operated to free the center portion of the top wall 22 from the truck body 146. Finally, the hydraulic jacks 36 on the third ring 30 are operated to free the remaining portions of the top wall 22 from the truck body 146. The side walls 24 of mold 20 are likewise peeled from the side walls 138 of the truck body 146 by means of the hydraulic jacks 40. Finally the end wall 28 of mold 20 is pivoted back to its horizontal position to free the end wall 28 from the truck body 146.

After the walls of the mold 20 have been stripped from the truck body 146, the truck body 146 is left supported on the dolly 48. The dolly 48 is then rolled out of the mold 20 onto the tracks 120 where the truck body 146 is removed from the dolly 48. Since the floor 26 of mold 20 is merely a sheet of wood, and the bottom of the truck body 146 is not visible, the floor 26 can be left attached to the truck body 146.

Thus, there is provided a one-piece plastic truck body which is fabricated in a relatively short period of time by only a single operator with one or two assistants. Since the inner surfaces of the walls of the mold 20 are highly polished, the outer surfaces of the truck body 146 are smooth finished surfaces. By providing the inner surfaces of the side walls 24 of mold 20 with the raised letters 64, the outer surfaces of the sides 138 of the truck body 146 will be provided with corresponding indentations. Thus, the truck body 146 is provided with permanent advertising matter which requires no additional maintenance. If raised indicia letters are desired instead of the indented letters shown, the raised letters 64 attached to the side walls 24 should be replaced by masks of a heavy destructible material, such as cardboard or the like, having openings therethrough of the shape of the letters. When the plastic is applied on the walls 24 the plastic will fill the openings to form the raised letters. After the mold has been stripped from the sides 138 of the truck body 146, the masks can be stripped from the sides 138. To obtain a colored truck body, it is only necessary to incorporate colored pigments in the resin used to make the truck body. By using pigmented resin the coloring will extend throughout the entire thickness of the walls of the truck body. Thus, the truck body will have a permanent color which requires no additional maintenance. If desired, door hinges and other similar hardware can be imbedded in the plastic before the plastic hardens.

Although the apparatus and method of the present invention has been described with respect to fabricating a truck body, the apparatus and method of the present invention can be used for fabricating other types of large structures. To make a desired structure, it is only necessary to shape and arrange the walls of the mold 20 to correspond with the shape of the desired structure. The walls of the mold are then coated with the plastic and reinforcing agent in the manner heretofore described.

I claim:

1. Apparatus for forming a one-piece plastic truck body comprising a plurality of spaced, parallel rings, means supporting each of said rings for rotation about a horizontal axis which is perpendicular to said rings and extends through the center of said rings, and a mold extending through and supported on said rings, said mold including a pair of opposed, substantially rectangular side walls, said side walls being substantially parallel to each other and to said axis, each of said side walls being supported on each of said rings by a pair of jacks, a substantially rectangular top wall extending across the upper edges of said side walls, said top wall being supported on each of said rings by a pair of jacks, and a floor extending between said side walls, said floor being substantially parallel to and spaced from said top wall, said jacks permitting movement of said side walls toward and away from each other and movement of said top wall toward and away from said side walls.

2. Apparatus in accordance with claim 1 including a pair of spaced parallel tracks extending through and mounted on siad rings beneath said floor and a dolly riding on said tracks and supporting said floor.

3. Apparatus in accordance with claim 2 including a second dolly riding on said tracks, and an end wall carried by said second dolly, said end wall being movable between a position substantially parallel to said axis and a position where the end wall extends between said side walls, top wall, and floor.

4. Apparatus for forming a one-piece plastic truck body comprising a plurality of spaced, parallel rings, means supporting each of said rings for rotation about a horizontal axis which is perpendicular to said rings and extends through the center of said rings, and a mold extending through and supported on said rings, said mold including a pair of opposed, substantially rectangular side walls, said side walls being substantially parallel to each other and to said axis, a substantially rectangular top wall extending across the upper edges of said side walls, a floor extending between said side walls, said floor being substantially parallel to and spaced from said top wall, a pair of spaced, parallel tracks extending through and mounted on said rings beneath said floor, and a dolly riding on said tracks and supporting said floor.

5. Apparatus for forming a one-piece plastic truck body comprising a plurality of spaced, parallel rings, means supporting each of said rings for rotation about a horizontal axis which is perpendicular to said rings and extends through the center of said rings, and a mold extending through and supported on said rings, said mold including a pair of opposed, substantially rectangular side walls, said side walls being substantially parallel to each other and to said axis, a substantially rectangular top wall extending across the upper edges of said side walls, a floor extending between said side walls, said floor being substantially parallel to and spaced from said top wall, a pair of spaced, parallel tracks extending through and mounted on said rings beneath said floor, a dolly riding on said tracks, and an end wall carried by said dolly, said end wall being movable between a position substantially parallel to said axis and a position where the end wall extends between said side walls, top wall, and floor.

6. Apparatus in accordance with claim 5 in which said end wall comprises two separate sections, each of said sections being adjustably mounted on the frame of said dolly for movement toward and away from the other section.

7. Apparatus for forming a one-piece plastic truck body comprising a plurality of spaced, parallel rings, means supporting each of said rings for rotation about a horizontal axis which is perpendicular to said rings and extends through the centers of said rings, a mold extending through and supported on said rings, said mold including a pair of opposed, substantially rectangular side walls, said side walls being substantially parallel to each other and to said axis, a substantially rectangular top wall extending across the upper edges of said side walls, a floor extending between said side walls, said means being selectively operable to position each of said walls individually in a horizontal position, said floor being substantially parallel to and spaced from said top wall, and a substantially rectangular end wall, said end wall being movable between a position substantially parallel to said axis and a position where the end wall extends between said side walls, top wall, and floor, and means for carrying a boom through said mold so that a plastic coating may be applied on said side and top walls while said walls are in a horizontal position.

8. Apparatus in accordance with claim 7 in which said boom is provided with an operator platform on one end thereof, and means carrying said boom for movement of said platform through the mold.

9. The method of forming a plastic truck body in a mold having a pair of side walls, a top wall, an end wall, and a floor, with the inner surfaces of said walls and floor arranged to conform with the shape of said truck body comprising the steps of placing said end wall in a horizontal position with the inner surface of the end wall facing upwardly, coating the inner surface of said end wall with a plastic in liquid form, setting said plastic coating, placing said end wall in a vertical position between the side walls, top wall, and floor, rotating said mold to selectively position the inner surface of each of said side walls, top wall, and floor in a horizontal position and facing upwardly, coating each of said surface with a plastic in liquid form while in the horizontal position, setting said plastic coating before further rotating said mold, curing said plastic coatings, and then stripping said mold from the cured plastic article.

10. The method in accordance with claim 9 in which the walls are stripped from said plastic article by peeling the walls from the article.

References Cited in the file of this patent
UNITED STATES PATENTS

| | | |
|---|---|---|
| 984,216 | Henderson | Feb. 14, 1911 |
| 1,134,543 | McArthur | Apr. 6, 1915 |
| 1,156,077 | Higgins | Oct. 12, 1915 |
| 1,795,862 | Johnson | Mar. 10, 1931 |
| 2,390,351 | Bolton | Dec. 4, 1945 |
| 2,417,226 | Weyant | Mar. 11, 1947 |
| 2,850,784 | Asweiler | Sept. 9, 1958 |

FOREIGN PATENTS

| | | |
|---|---|---|
| 901,152 | Germany | July 8, 1949 |
| 269,262 | Great Britain | Apr. 19, 1927 |
| 400,050 | Great Britain | Oct. 19, 1933 |